United States Patent
Warhol (10) Patent No.: US 11,270,510 B2
(45) Date of Patent: Mar. 8, 2022

(54) SYSTEM AND METHOD FOR CREATING AN AUGMENTED REALITY INTERACTIVE ENVIRONMENT IN THEATRICAL STRUCTURE

(71) Applicant: David Peter Warhol, El Segundo, CA (US)

(72) Inventor: David Peter Warhol, El Segundo, CA (US)

( * ) Notice: Subject to any disclaimer, the term of this patent is extended or adjusted under 35 U.S.C. 154(b) by 0 days.

(21) Appl. No.: 15/944,865

(22) Filed: Apr. 4, 2018

(65) Prior Publication Data

US 2018/0286134 A1 Oct. 4, 2018

Related U.S. Application Data

(60) Provisional application No. 62/510,331, filed on May 24, 2017, provisional application No. 62/481,272, filed on Apr. 4, 2017.

(51) Int. Cl.
*G06T 19/00* (2011.01)
*H04N 13/366* (2018.01)
*G06F 3/01* (2006.01)

(52) U.S. Cl.
CPC ............ *G06T 19/006* (2013.01); *G06F 3/011* (2013.01); *H04N 13/366* (2018.05)

(58) Field of Classification Search
CPC .. G06T 19/006; H04N 13/366; H04N 13/368; G06F 3/011
See application file for complete search history.

(56) References Cited

U.S. PATENT DOCUMENTS

| | | | |
|---|---|---|---|
| 2004/0194127 A1* | 9/2004 | Patton | H04N 21/23412 725/32 |
| 2011/0149043 A1* | 6/2011 | Koh | H04N 13/117 348/46 |
| 2012/0142415 A1* | 6/2012 | Lindsay | G06T 19/006 463/33 |
| 2013/0300637 A1* | 11/2013 | Smits | G03B 35/18 345/8 |
| 2014/0160115 A1* | 6/2014 | Keitler | H04N 9/3185 345/419 |

(Continued)

*Primary Examiner* — Xiao M Wu
*Assistant Examiner* — Jonathan M Cofino
(74) *Attorney, Agent, or Firm* — Meister Seelig & Fein LLP; Seth H. Ostrow, Esq.

(57) ABSTRACT

A system comprising a screen, client devices comprising processing devices that render an augmented or mixed reality interactive environment that is shared among the client devices, the augmented or mixed reality interactive environment including one or more virtual objects and narratives, wherein one or more of the client devices are configured to generate an individualized experience in the augmented or mixed reality interactive environment, a given one of the client devices including an output device configured to project images on the screen, the projected images associated with the augmented or mixed reality interactive environment, and an input device configured to receive user interactions with the augmented or mixed reality interactive environment. The system further comprises a server communicatively coupled to the client devices via a network, the server monitors the user interactions and modifies the one or more virtual objects and narratives.

20 Claims, 4 Drawing Sheets

(56) References Cited

U.S. PATENT DOCUMENTS

| | | | |
|---|---|---|---|
| 2014/0171039 A1* | 6/2014 | Bjontegard | H04W 4/029 |
| | | | 455/414.1 |
| 2014/0354690 A1* | 12/2014 | Walters | G06T 19/006 |
| | | | 345/633 |
| 2015/0130836 A1* | 5/2015 | Anderson | G06T 19/006 |
| | | | 345/633 |
| 2015/0319376 A1* | 11/2015 | Nemeckay | G06T 7/194 |
| | | | 345/633 |
| 2016/0267699 A1* | 9/2016 | Borke | G06F 3/011 |
| 2016/0350973 A1* | 12/2016 | Shapira | G06F 3/017 |
| 2017/0225084 A1* | 8/2017 | Snyder | A63G 7/00 |
| 2017/0285758 A1* | 10/2017 | Hastings | G06F 3/011 |
| 2018/0137680 A1* | 5/2018 | Nocon | G06T 19/006 |
| 2019/0086787 A1* | 3/2019 | Urey | G02B 5/136 |
| 2019/0098286 A1* | 3/2019 | Urey | G03B 21/62 |
| 2019/0279428 A1* | 9/2019 | Mack | A63F 13/211 |
| 2019/0391724 A1* | 12/2019 | Holz | G06F 3/017 |

\* cited by examiner

SYSTEM AND METHOD FOR CREATING AN AUGMENTED REALITY INTERACTIVE ENVIRONMENT IN THEATRICAL STRUCTURE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein relates to a system for creating an augmented or mixed reality environment, and in particular, an entertainment system that provides interactive virtual objects in a unique interactive experience among a group of participants.

Description of the Related Art

Augmented reality (AR) technology allows virtual imagery to be mixed with a real-world physical environment. A user of the AR technology may experience live direct or an indirect view of a physical, real-world environment whose elements are augmented by computer-generated sensory input, such as sound or graphics. Computer graphics objects can be blended into real video and images in real time for display to an end-user. The user may further interact with virtual objects, for example by performing hand, head or voice gestures to move the objects, alter their appearance or simply view them. Traditional uses of AR have been focused around the gaming industry but have been limited in scope. Mixed reality (MR) technology can be distinguished from AR technology, in that typically in AR, virtual objects are placed in front of real world objects, whereas in MR, virtual objects are placed behind real world objects. In another point of differentiation, AR objects are the first thing that a user sees in front of real world objects, whereas MR objects are the last thing a user sees after real world objects.

Theme and other amusement park operators are consistently under pressure to create new rides and shows to continuously attract park visitors. Many parks include rides with shows that may tell a story and such shows may provide a theme to the ride or attraction. Entertainment attractions intended to entertain patrons with visual and/or audio materials such as characters (costumed, robotic or virtual), images, voices, noises, strobe lighting, etc., are known. These prior attractions are designed using images, lighting and/or audio materials. While show or ride characters may be realistic, people quickly lose their belief (or their suspension of disbelief) with relation to mechanized or robotic figures or show/ride equipment. Thus, there is a need for methods and systems for providing improved show or entertainment equipment using AR and MR technology.

SUMMARY OF THE INVENTION

The present invention provides system for providing an augmented reality interactive environment. According to one embodiment, the system comprises a reflective screen or green screen, a first plurality of client devices comprising processing devices that render a first augmented or mixed reality interactive environment that is shared among the first plurality of client devices, the first augmented or mixed reality interactive environment including one or more first virtual objects and narratives, wherein one or more of the first plurality of client devices are configured to generate an individualized experience in the first augmented or mixed reality interactive environment, a given one of the first plurality of client devices including an output device configured to project images on the reflective or green screen, the projected images associated with the first augmented or mixed reality interactive environment, and an input device configured to receive user interactions with the first augmented or mixed reality interactive environment; and a server communicatively coupled to the first plurality of client devices via a network, the server monitors the user interactions and modifies the one or more first virtual objects and narratives based on the user interactions.

In one embodiment, the system further comprising a theatrical structure including the reflective screen or green screen on surrounding walls of the theatrical structure. The first plurality of client devices may render the first augmented or mixed reality interactive environment by augmenting physical real-world image elements with three-dimensional virtual-world image imagery. The first plurality of client devices may also render the first augmented or mixed reality interactive environment by merging physical real-world image elements with digital elements. The input device may comprise a controller device that controls rendering of elements within the first augmented or mixed reality interactive environment. The input device can detect a position of a user of the given one of the first plurality of client devices. In one embodiment, the server further modifies the one or more first virtual objects and narratives to react to the position and a viewing direction.

The given one of the first plurality of client devices may further comprise at least one sensor device configured to detect position markers to establish planar surfaces. The given one of the first plurality of client devices may interpolate a user's position relative to the position markers detected by the at least one sensor device. The given one of the first plurality of client devices may further comprise at least one sensor device selected from a group consisting of: cameras, microphones, radio-frequency identification devices, location detection systems, climate indicators, and physiological sensors. The first plurality of client devices may render feature enhancements to the first augmented or mixed reality interactive environment in response to receiving micro-transactions. The feature enhancements may include a modification to the one or more first virtual objects and narratives. The server may further modify the one or more first virtual objects and narratives based on the user participation data. The feature enhancements may include a modification to the narratives within the first augmented or mixed reality interactive environment. The server may further generate user records including user participation data associated with the first augmented or mixed reality interactive environment.

In another embodiment, the system further comprises a second plurality of client devices comprising processing devices that render a second augmented or mixed reality interactive environment that is shared among the second plurality of client devices, the second augmented or mixed reality interactive environment including one or more second virtual objects and narratives, wherein one or more of the second plurality of client devices are configured to generate an individualized experience in the second augmented or mixed reality interactive environment. The server may be coupled to the second plurality of client devices via the network. The server is able to facilitate interactions between users in the first augmented or mixed reality interactive environment with users in the second augmented or mixed reality interactive environment by establishing a connection between the first plurality of client devices and the second plurality of client devices. The interactions may include cooperative, player versus player, and interactive environment versus interactive environment play.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Figure 1:
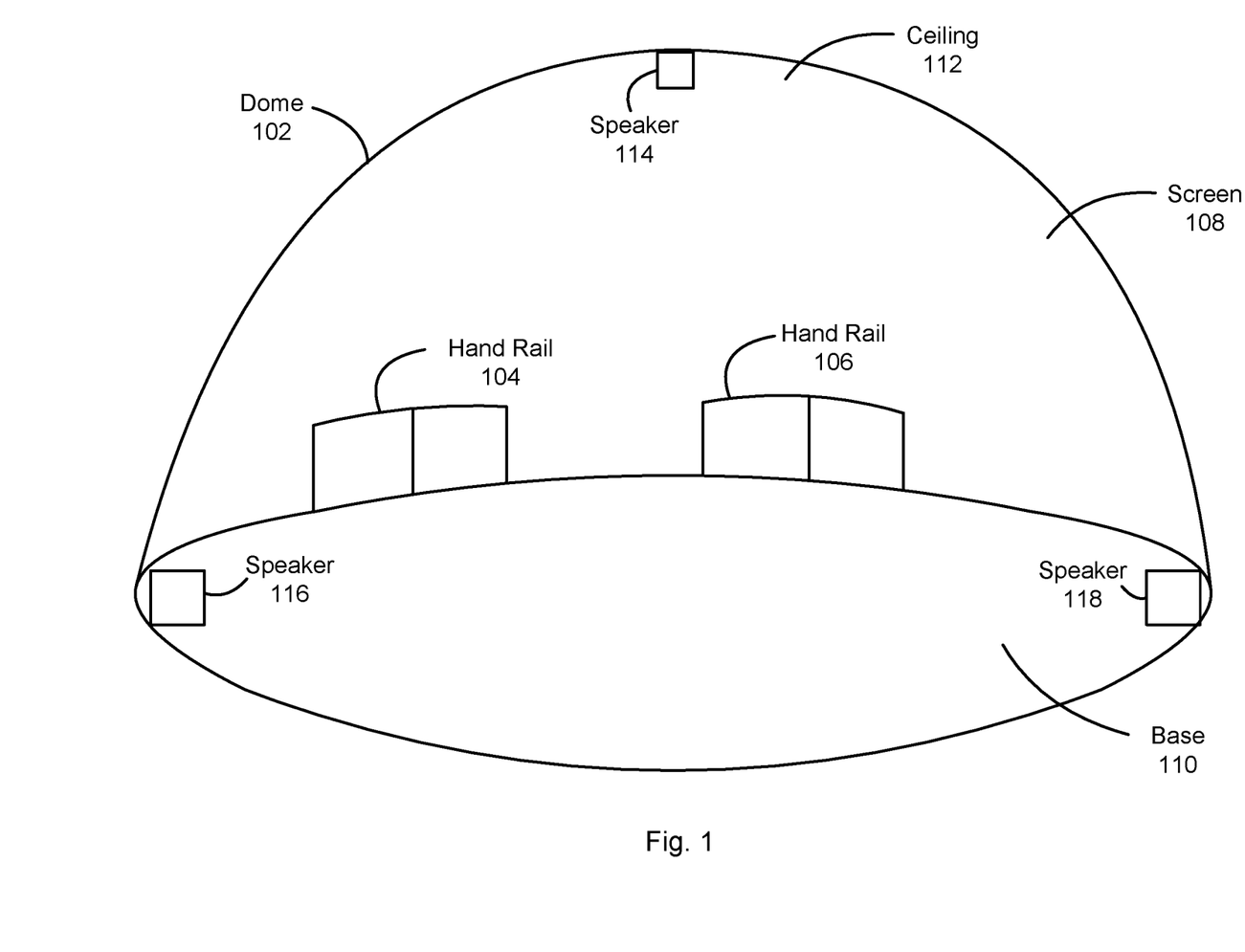
FIG. 1 illustrates an interactive environment system according to an embodiment of the present invention.

FIG. 1 presents an interactive environment system according to an embodiment of the present invention. The system may comprise a dome 102 that can be configured for exploration by a plurality of human users (as few as one or two persons, typically 15-20 persons, however the invention described herein can apply to audiences larger than 20 persons). Dome 102 comprises a theatrical structure including a screen 108 (or screens) along the walls that may surround the structure in a 360-degree fashion and extend from the base 110 to the ceiling 112 of the dome 102. The dome 102 may further include hand rail 104 and hand rail 106 (e.g., as a means for walking support, for keeping the audience an optimal distance from the screen, or to provide protection and accessibility for disabled persons). According to other embodiments, the interactive environment system may comprise other architectural shapes such as a cube, sphere, pyramid, etc. Dome 102 may provide an active participant open area that allows users to stand and walk around within the dome 102, for example, to explore a virtual environment as perceived by the users from images shown/reflected off screen 106.

In one embodiment of the present invention, the system provides users with an interactive synthetic augmented reality and/or mixed reality environment combination. The augmented reality (AR) aspect generally includes a system that augments physical real-world environment elements with computer-generated imagery (e.g., a virtual environment in three-dimensional space (3D) or two-dimensional space (2D)), to enhance and/or diminish the perception of reality. The mixed reality (MR) aspect generally includes a variant of AR wherein the computer-generated imagery appears at greater perceived distances and beyond real-world objects. MR may also include the merging of real and virtual-world image elements to produce new environments and visualizations where physical and digital objects co-exist and interact in real-time. The augmented reality and/or mixed reality environment combination may be produced by utilizing an output device, e.g., an image projection device and/or glasses configured to project augmented or mixed reality images, with the screen 106 of dome 102.

Screen 106 may comprise a retro-reflective material (e.g., micro-beads) configured for use with the output device. For example, an output device may project a pair of stereoscopic images that are reflected to each of the user's eyes (or glasses) off from the retro-reflective material screen. The reflective material of the screen 106 allows the two projected images to reflect back into each eye to thereby effect a three-dimensional or stereoscopic image experience. In another embodiment, screen 106 may comprise a "green screen" material, wherein objects in front of the green screen can be viewed with a viewer/glasses/goggle and are computationally isolated from the green screen to allow computer generated images to be replaced with AR/MR elements where the green screen appears. Speaker 114, speaker 116 and speaker 118 are operable to provide environmental audio and three-dimensional sound to complement the three-dimensional images seen by the users. According to another embodiment, three-dimensional or surround sound may be synchronized with virtual objects from both shared and multi-located positions (e.g., by using headphones).

Figure 2:
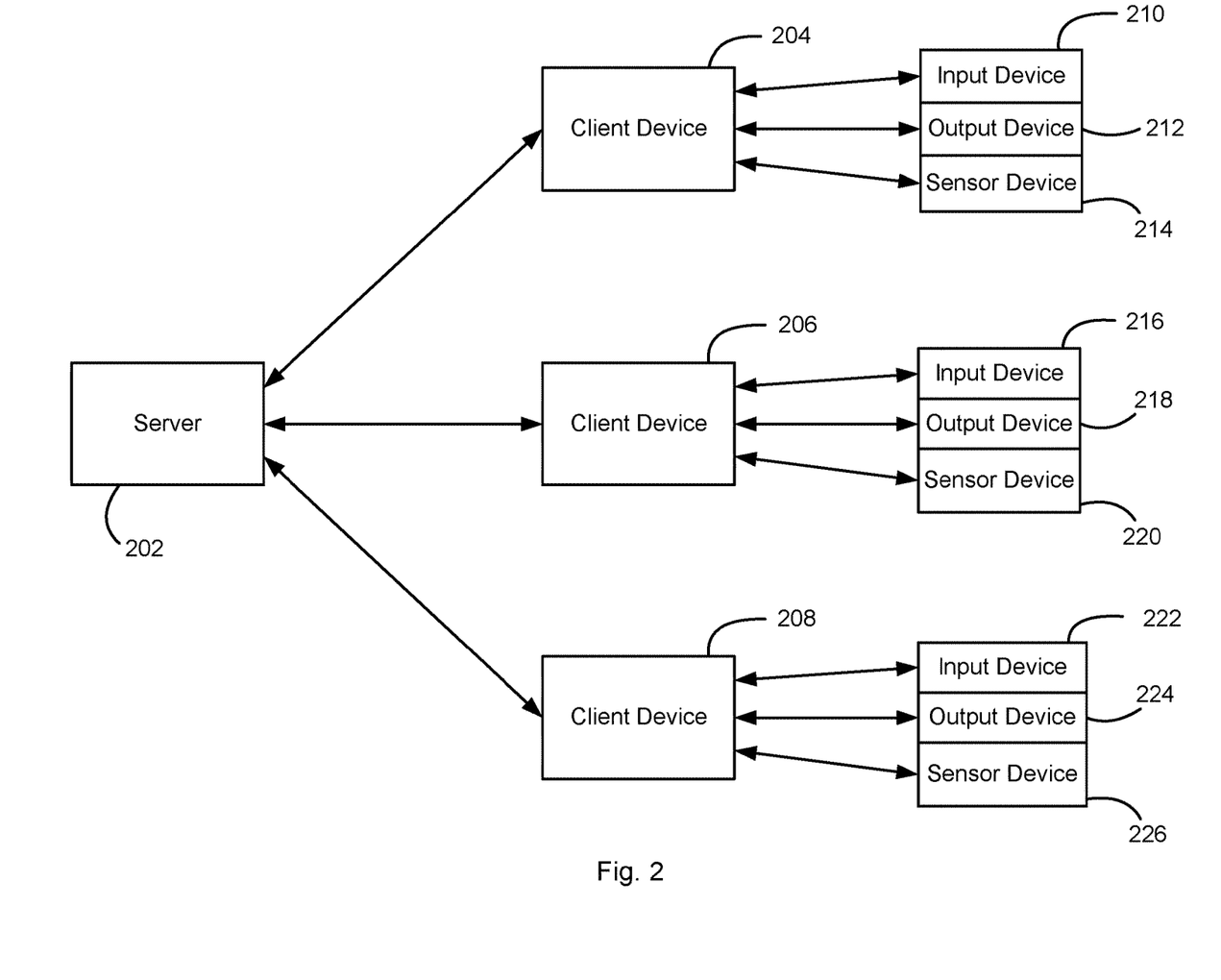
FIG. 2 illustrates a computing system according to an embodiment of the present invention.

FIG. 2 presents a computing system usable in an interactive environment system (e.g., a theatrical structure as described in FIG. 1) to augment reality with two- and three-dimensional virtual reality information and data. The system comprises server 202 that is communicatively coupled with client device 204, client device 206, and client device 208 via a wireless network (e.g., WiFi). Client devices may comprise computing devices (e.g., mobile devices, laptops, personal digital assistants (PDA), cell phones, tablet computers, or any computing device capable of connecting to a network, having a central processing unit, graphics processing unit, memory, and a power system such as a battery). For example, a web-enabled client device, which may include mass storage, one or more accelerometers, one or more gyroscopes, global positioning system (GPS) or other location identifying type capability. According to one embodiment, a client device may be carried in a backpack, pouch, vest, strap, headset, or the like, by users participating in an entertainment session within an interactive environment system. A client device may include or execute a variety of operating systems, including a personal computer operating system, such as a Windows, Mac OS or Linux, or a mobile operating system, such as iOS, Android, or Windows Mobile, or the like. A client device may also include or execute an application to communicate content, such as, for example, textual content, multimedia content, or the like. Client devices may also include or execute an application to perform a variety of possible tasks, such as browsing, searching, playing various forms of content, including locally stored or streamed video, or games.

The client devices are operable to generate augmented and mixed reality entertainment sessions for users to participate in, preferably within the dome. Client devices may be carried or worn by users when engaged in an augmented or mixed reality entertainment session. According to one embodiment, augmented and mixed reality data can be processed and rendered by machinery and/or computers including the client devices to generate entertainment sessions for users in a cooperative setting. That is, an augmented or mixed reality entertainment session may be shared among a plurality of client device users while each of the client devices may also simultaneously render a unique/individualized experience to each user in the same augmented or mixed reality entertainment session, such that they view a shared virtual world each from their own perspective. Augmented or mixed reality data may include, but not limited to, sound, text, graphic content, video content, virtual objects, characters, environmental setting, time, user inputs, movement, location, orientation, positioning and/or global positioning system (GPS) data.

The client device can be coupled to an analysis engine or an augmented/mixed reality service hosted on a computing device, such as the server 202. In an example scenario, the client devices 204, 206, and 208 may be operated, for example, by users to activate an augmented or mixed reality application. A given client device may determine or be associated with a given user's context, which may include information associated with physical and virtual environments of the user, such as the user's location and/or orientation, e.g., within the dome, time of day, the user's personal preferences, the augmented/mixed reality services to which the user is participating, an image or object the user is pointing at or selecting, etc. Server 202 may receive session data from the plurality of client devices. The session data can include data associated with users of the client devices corresponding to input devices, output devices, and sensor devices. The server 202 may monitor the session data to, for example, modify one or more virtual objects, imagery, sound, music, or narratives to react to user activity.

The client devices in combination with an external, cloud, or central computing device/infrastructure, such as server 202, can be adapted to provide various entertainment scenarios. For example, the client devices can include a library of rendering models and algorithms adapted to perform real-time rendering of augmented or mixed reality objects while server 202 may include a library of various theme and story data. In one embodiment, augmented or mixed reality data can be stored or preloaded on the client devices. As such, rendering the augmented or mixed reality data can be processed locally on the client devices using positional, viewing direction, and/or hand-controller device information collected by the client devices. Client devices can be used to render the augmented or mixed reality data. According to one embodiment, the client devices can comprise graphics processing units or a computing system adapted to process and render graphics data. In another embodiment, server 202 can receive, process, and render the augmented or mixed reality data. The rendered data may then be transmitted (e.g., using wireless imaging communication protocols) to the client devices for display to a user. In yet another embodiment, the server 202 can send rendering instructions, format, or information to the client devices, which in turn, can render augmented or mixed reality data based on the received information.

According to another embodiment, the server 202 can transmit augmented or mixed reality data and corresponding rendering formats to the client devices which can render the received augmented or mixed reality data for presentation to the user. In yet another embodiment, the server 202 can render the augmented or mixed reality data and transmit rendered data to the client devices. Servers may vary widely in configuration or capabilities but is comprised of at least a special-purpose digital computing device including at least one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Client devices 204, 206, 208 can communicate with the server 202 over a communications network.

The communications network may be any suitable type of network allowing transport of data communications across thereof. The network may couple devices so that communications may be exchanged, such as between the server 202 and any one of client devices 204, 206, and 208, or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. The client devices 204, 206, and 208 may also communicate with each other by using near-field communications, such as radio communications, Bluetooth communications, infrared communications, and so forth.

The system also includes output devices, sensor devices, and input devices to register the virtual information to the physical environment, and vice versa. The input devices, output devices, and sensor devices may be coupled with and in communication with client devices. The client devices include operating systems or instructions for managing communications with the output devices, sensor devices and input devices. As illustrated in FIG. 2, input device 210, output device 212, and sensor device 214 are configured with client device 204, input device 216, output device 218, and sensor device 220 are configured with client device 206, and input device 222, output device 224, and sensor device 226 are configured with client device 208. An input device may comprise an interactive hand-controller device operable to receive data commands or physical stimulus to control or affect rendering of augmented or mixed reality data to interact with a virtual environment. The hand-controller device may control, for example, the position, orientation, and action of rendered virtual objects (stationary or movable) in a 3D space. For instance, a detected position and movement of the hand-controller device may determine the position and action of a virtual object or selecting a destination of the hand-controller device can determine the position and action of the virtual object.

Input devices may operate in conjunction with sensor devices, such as, a camera or optical sensors, to identify markers in an interactive environment system. According to one embodiment, one or more position trackers/markers may be configured within the physical environment (e.g., a theater) of the system to establish planar surfaces for a 360-degree environment. The markers may be positioned throughout the physical environment at various angles and positions that are sometimes occluded, such that non-planar positioning may be achieved. The sensor devices may be configured to detect the markers and transmit data associated with a planar arrangement based on the markers to a computing device. The computing device may receive the data to interpolate the user's position relative to the markers placed throughout the environment.

In one embodiment, a rendered virtual object may be associated with an input device in a manner to influence narrative outcome. A virtual leaf, for example, may be attached to a user's hand and the user may place the virtual leaf on their virtual hat using the input device. According to another embodiment, singular and aggregated individual and group input device data may be collected to influence narrative outcome. For example, a group of users may point their input devices to a virtual object in a collaborative action or vote thereby providing a collective influence in a shared augmented or mixed reality entertainment session. A user may also use an input device to control avatars that may be blended into an outfield (on or behind a screen) based on the user's position, viewing direction and input device information.

An output device may comprise eyewear, headwear, bodywear, and/or equipment that includes image projection means (e.g., stereoscopic or holographic in certain embodiments). A client device may process and communicate augmented or mixed reality data to an output device. Augmented and mixed reality images may be projected or displayed by an output device configured or otherwise coupled to a client device. The images may be presented in real-time, and may reflect user interactivity (based on data from input devices and sensor devices) with a virtual environment using technology such as computer vision, head-mounted display, virtual retinal display, object recognition, actuators, artificial intelligence (AI), etc. In one embodiment, the output device may include an image projection means operable to project a pair of stereoscopic images for each eye. The pair of stereoscopic images may be viewed on a retro-reflective or green material screen such that the pair of images is reflected back into each eye to thereby produce a three-dimensional effect. Alternatively, the output device may include a viewer, glasses, goggle, or the like, that is viewed in conjunction with green screen material, where objects in front of the green screen are rendered with computer generated images to be replaced where the green screen appears. In certain embodiments, output devices may also comprise speaker devices, vibration motors, and actuators to simulate various effects.

A sensor device can be used to monitor objects and contextual factors in the real (e.g., physical) world. Non-limiting examples of a sensor device include an optical sensor, webcam, digital camera, digital camcorder, camera built into a cell phone or other PDA type device. By way of specific examples, other kinds of sensor devices that may be employed include sensory mechanisms to track factors related to the physical real-world (e.g., markers and objects), optics, microphones, radio-frequency identification (RFID) devices, location detection systems (e.g., global position systems (GPS)), and climate indicators (e.g., thermometers). Physiological sensors can also be used to capture mood, engaged activity, heart rate, blood pressure, etc.

Accordingly, an output device may be enhanced with a sensor device that tracks motion (used in conjunction with passive visible or active infrared markers) or with any other sensor that detects the position or state of the user. The enhancement may be used to modify and affect a user's augmented or mixed reality experience. An interactive positioning camera effect may be created based on the position and actions of a user or group of users in an entertainment session. For example, a virtual ship may tilt to one side if everyone in the entertainment session runs to that side of the interactive environment system. According to one embodiment, session and experience of a client device user may be captured, recorded or recreated from their point of view and rendered into a video or multimedia playback file. A recording of a user may be captured from one or more of an input device, sensor, and camera(s) in the interactive environment system.

Output devices, sensor devices, and input devices may also be enhanced with computer vision, image recognition, video tracking, edge detection, behavior-learning software and hardware. For example, interoperability of the sensor devices and input devices with output devices can be used to enhance interactivity of virtual objects with users. Interactive virtual objects (and flow in gameplay narrative) may be configured to react based on the position, viewing direction in the interactive environment system, and activities (e.g., controller input) of a user or a group of users. Positioning of interactive virtual objects (individually or as a group) may be rendered based on position of participant or group of participants. Behavior of the virtual objects may also be based on the participant'(s) activities or other sensor-detected factors of the user(s) in the entertainment sessions. A user of a client device may move within an interactive environment system and virtual object may follow the user. For example, a dinosaur may be able to find and follow specific participant(s) in a dinosaur themed augmented or reality entertainment session. Logic and analysis mechanisms may be employed on server 202 to evaluate real-world objects, movements and contextual factors in relation to virtual objects. Reality-based actions and objects may be monitored and used to compile information related to the reality-based actions and objects and augment (or overlay) virtual data onto a perceived environment (observed by the user from stereoscopic images).

Real-time user positional, rotational, and input device (e.g., an interactive controller device) information may be accumulated by server 202 for study of efficacy of interactive narrative elements, including automatic feedback into future interactive sessions. For instance, participants may favor certain virtual objects and not others—this behavior can be recorded as a statistical advantage and fed back into the interactive entertainment system (or server) to improve and modify virtual objects interaction with users over time (e.g., using a learning machine). As such, a virtual object may over time become more habituated to users because it has been treated nicely by previous users. Treatment of virtual objects and characters may be tracked and used to change the virtual objects and characters based on the real experiences. Hence, long-term virtual object behavior may be modified based on direct user participation, locally and in trans-location.

Augmented or mixed reality experiences of users within a same interactive environment system may be shared, related, varied, or a combination thereof. According to one embodiment, individualized presentation of global interactive objects and actions in a narrative environment are relative to individual participants. Each participant may experience a global event while having a unique experience as if at least a portion of the global event is directed specifically to them. For example, within a global event, each user may see a narrative object or virtual object specifically appearing next to them or experiences a local event specifically occurring to them (but does not see the same experience occurring to other users). Local events or experiences may be optimally positioned to a given user to provide the best dramatic experience by using Cartesian math, for example.

According to another embodiment, multiple versions of an immersive three-dimensional environment may be depicted and customized to individuals such that virtual objects, lighting, environments, or sounds appear differently to each participant. For example, all users within an augmented or mixed reality entertainment session may be presented with a hidden object game where one or more users see certain objects and one or more other users see other objects. Thus, users within the same augmented or mixed reality entertainment session may experience a shared and yet individualized experience. Similarly, multiple positions and/or versions of an immersive three-dimensional environment may be depicted and customized to individuals, such that a background appears entirely differently to each participant via separate camera angles or entirely different geometries, allowing each participant to appear in their own version of a three-dimensional environment or world. For example, a user may have an experience in the setting of the Grand Canyon during winter and another user may have an experience in the Grand Canyon as well but during the summer. In another example, users within a shared entertainment session may experience settings in different capital cities or within a same city but in different perspectives, positions, parts of the city, etc.

In one embodiment, a means for compensating of temporary occlusion of a three-dimensional object represented in a user space is provided. The means for compensating allows for an uninterrupted virtual experience in certain instances when an image projection from an output device is not reflected or reflected properly from a retro-reflective material or green screen (e.g., another user blocking the reflection). Means for compensating may include increasing brightness or adding blurred lines to fool the human eye upon detection (e.g., via a sensor device) that a user's image projection from their output device is not being reflected back in a manner suitable for proper augmented or mixed reality viewing. According to another embodiment, retro-reflective or green material may be worn by every user in the interactive environment system (e.g., backpack, vest, suit, or any other type of garment or accessory).

According to an embodiment of the present invention users may enhance their interactive experience in an interactive environment system through micro-transactions. The micro-transactions may be performed either prior to or during an entertainment session. Features may be available for purchase to further enhance an experience in an entertainment session. Narrative outcomes may be pre-planned or pre-influenced via an online or on-location purchase. For example, users may influence virtual objects or specifically target specific users for certain events via a feature add-on or package that may be purchased. According to another embodiment, a narrative experience may be changed or enhanced based on a transaction decision to purchase items within an entertainment session (e.g., purchasing more ammunition, upgrade a weapon, skip an activity or stage, instantly kill a monster, destroy an object, etc.). In another embodiment, users' repeated use or participation in entertainment sessions may be tracked or recorded (e.g., generating user accounts or records that are stored at either the server or client device level) and used to modify narrative outcomes. For example, an increased difficulty level or modified virtual objects may be provided to a user who has participated in multiple entertainment sessions of a given type. Users may be given membership cards or IDs which may be used to track their participation in entertainment sessions and associated with client devices or equipment.

Figure 3:
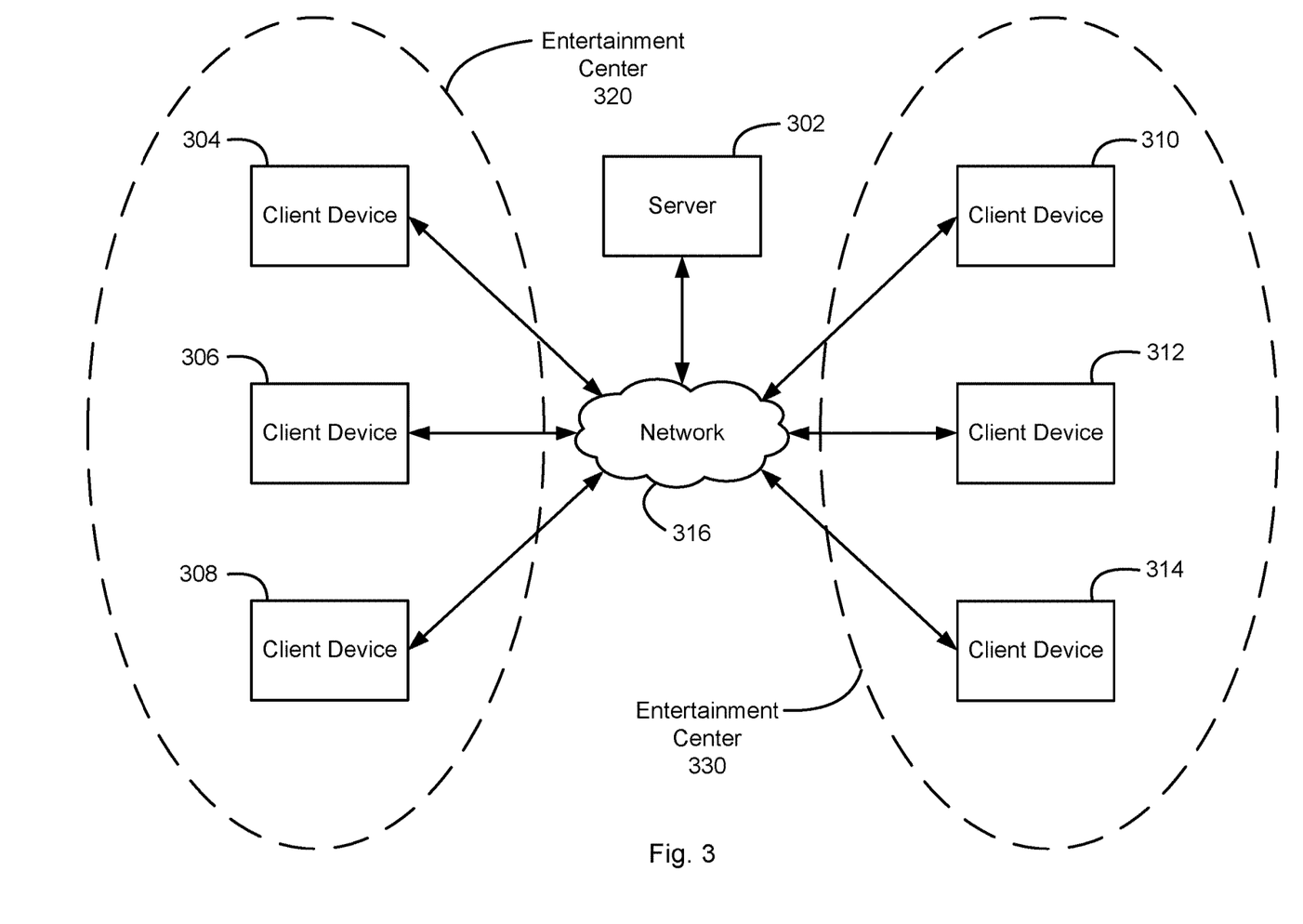
FIG. 3 illustrates another computing system according to an embodiment of the present invention.

FIG. 3 presents another computing system according to an embodiment of the present invention. The system comprises server 302, network 316, entertainment center 320 and entertainment center 330. Entertainment center 320 comprises an interactive environment system that includes client device 304, client device 306, and client device 308. Entertainment center 330 comprises an interactive environment system that includes client device 310, client device 312, and client device 314. According to the illustrated embodiment, multiple interactive environment systems may be simultaneously connected into a single entertainment session. Specifically, server 302 is operable to couple two or more interactive entertainment environments for a single entertainment session. For example, users of the client devices in entertainment center 320 may be connected to users of client devices in entertainment center 330 in either cooperative, player versus player, or entertainment center versus entertainment center play (e.g., interactive environment versus interactive environment). According to another embodiment, real-time shared narrative information may be modified and deployed across multiple locations based on entertainment center location, time of day, usage statistics, and creative direction. For example, users in an entertainment center in California may see creatures before users in an entertainment center in Florida when an alien invasion of a virtual world starts from the west coast and heads towards the east coast.

Figure 4:
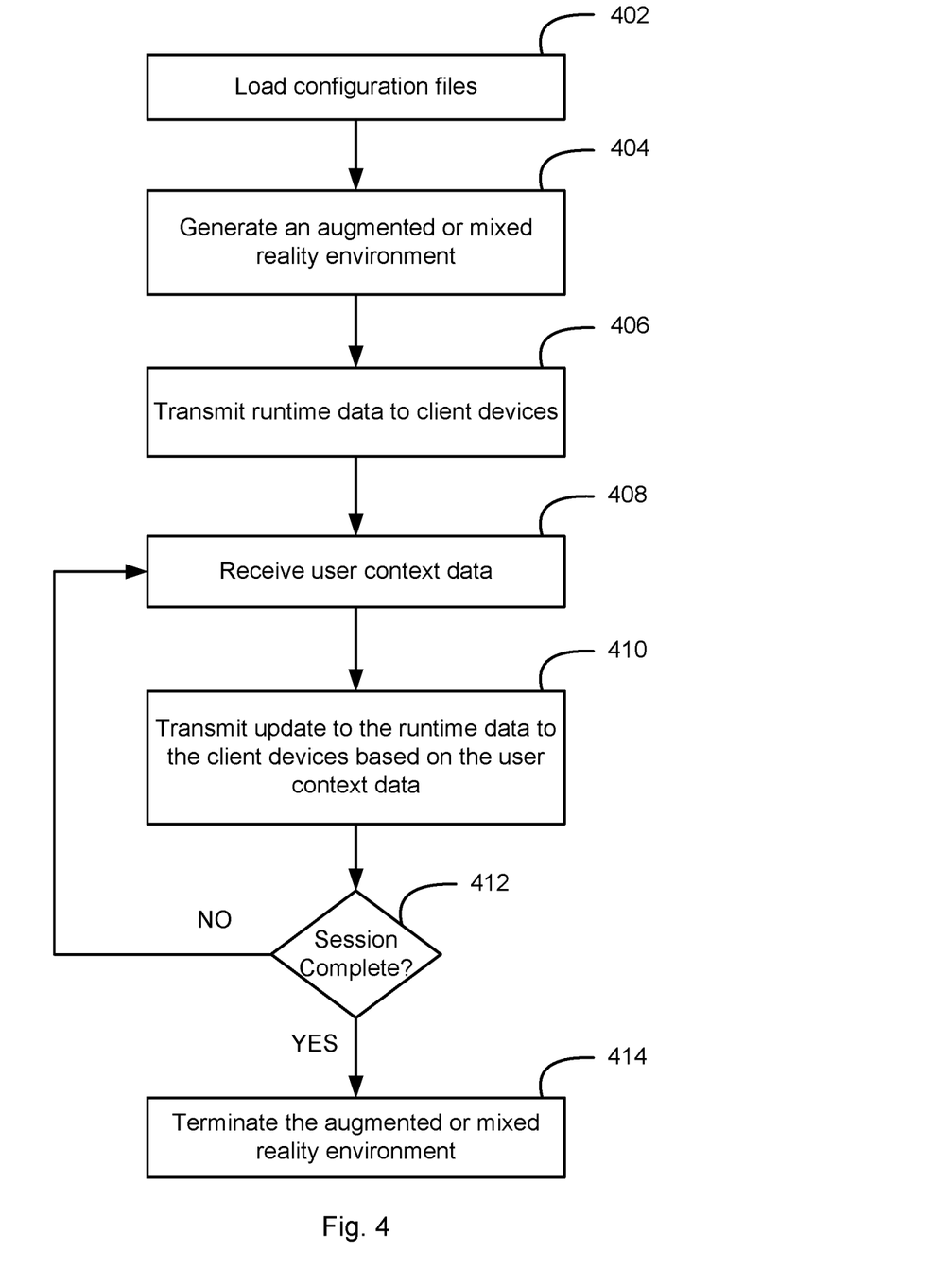
FIG. 4 illustrates a flowchart of a method according to one embodiment of the present invention.

FIG. 4 presents a flowchart of a method for providing an augmented reality interactive environment according to an embodiment of the present invention. An augmented reality session may be initiated. In the augmented reality session, multiple users of client devices are able to interact or collaborate with each other with respect to augmented reality presentations. To begin the augmented reality session, configuration files are loaded on a server, step 402. The configuration files may include data files for stories, themes, characters, environment, tasks or objectives, audio sounds, visual renderings and models for creating an augmented reality or mixed reality environment for the session.

An augmented reality or mixed reality environment is generated by the server, step 404. The augmented reality or mixed reality environment may comprise a global model including a plurality of local models for rendering a portion of the augmented reality or mixed reality environment. Each of the local models may be assigned or configured to a given client device. A model may include data object comprising location data defining locations in 3D space for virtual elements, structural data defining 3D surface structures of the virtual elements, and image data defining surface texture of the surface structures. For example, based on the model, an augmentation of a real-world object that is in front of its perceived location from the perspective of the user may be generated for interaction by a user of a client device.

Runtime data is transmitted to client devices, step 406. The runtime data may include at least part of the global model and a local model for rendering virtual objects at client devices, thereby allowing users of the client devices to explore and a virtual or augmented version of the real-world environment remotely. Additionally, the runtime data may include sounds, characters and other visual renderings for the augmented reality or mixed reality environment. According to one embodiment, an optical component may be connected to the client device to receive video data from the runtime data and project images corresponding to the video data to provide an augmented reality experience. To provide a stereoscopic image or an image that is perceived as having 3D structure by the user, slightly different versions of a 2D image can be projected onto each eye.

User context data is received by the server, step 408. The user context data may include location and orientation data, user interaction/command data, and client device controls. Client devices may generate or determine user context data from, for example, voice and speech recognition, intention and goal understanding, motion gesture detection, facial recognition, head, eye, and gaze tracking etc. For example, augmentation reality presentations may be rendered visible to the user of the client device in which a user may react or interact to the augmentation. The user's activities may be captured in user context data by the client device and transmitted to the server. In an augmented reality session, the users of client devices can make inputs to augmented reality presentations that may cause modification of the augmented reality presentations. As an example, if the augmented reality are presentations of an online electronic game, then the input from each user can be a game control input that causes game pieces to perform actions. During the course of playing of the online electronic game, user interactions with the game at the client devices, including movement of game pieces and activation of game play controls, can be communicated to the server.

An update to the runtime data is transmitted to the client devices based on the user context data, step 410. The user's activities in the user context data may be used by the server to generate a response via an update to the runtime data. The update may include changes in models, sounds, characters and other visual renderings in response to performing certain activities or achievements of certain goals, objectives, missions, tasks, or criteria. The server determines whether the augmented reality session has been completed, step 412. The augmented reality session may be completed upon, for example, one or more users of the client devices completing certain goals, objectives, missions, tasks, or criteria. According to another embodiment, the augmented reality session may be completed upon an expiration of time, e.g., 30 minutes, and hour, etc. Otherwise, the augmented reality session can continue to receive user context data at step 408.

When the server determines that the augmented reality session has been completed, it terminates the augmented reality or mixed reality environment, step 414. Terminating the augmented reality or mixed reality environment may include the server transmitting a message to the client devices that the augmented reality session has been completed, a performance summary or scoring of the users of the client devices, and terminating communication connection with the client devices.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random-access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for providing an augmented or mixed reality interactive environment, the system comprising:
a retro-reflective screen disposed on walls of an enclosed structure, the retro-reflective screen returning light transmitted to the retro-reflective screen by reflection from microscopic beads, wherein the enclosed structure includes physical real-world objects and users in front of the retro-reflective screen;
a first plurality of client devices comprising processing devices that render stereoscopic images projected on at least a portion of the retro-reflective screen, the stereoscopic images reflected from the retro-reflective screen to eyes of a user of a given one of the first plurality of client devices and effecting three-dimensional images, the images associated with a first augmented or mixed reality interactive environment that are shared among the first plurality of client devices, the first augmented or mixed reality interactive environment including a plurality of first virtual objects and a virtual world setting including a rendering of a background, a global event including a narrative corresponding to the virtual world setting that is shared among the first plurality of client devices, and at least one local event including a narrative corresponding to the virtual world setting specific to a given one of the first plurality of client devices, wherein one or more of the first plurality of client devices are configured to generate an individualized experience in the first augmented or mixed reality interactive environment, wherein a first and a second of the first plurality of client devices each include:
an output device configured to project the stereoscopic images including the plurality of first virtual objects that are visibly reflected from the retro-reflective screen to appear on given portions of the retro-reflective screen in relative positions and locations that are perceived by the users within the enclosed structure based on corresponding user perspectives of the shared images, the stereoscopic images projected from the output device reflected and returning to the eyes of the user, wherein the user has a line of sight to the retro-reflective screen around boundaries of the physical real-world objects in real-world positions without conflict or overlap in a viewing space in front of the retro-reflective screen, the plurality of first virtual objects associated with the narratives corresponding to the virtual world setting and individualized for respective ones of the first and second of the first plurality of client devices such that a first one of the plurality of first virtual objects concurrently appears different to each user of the first and second of the first of the plurality of client devices during a global event and a second one of the plurality of first virtual objects appears to a given one of the first and second of the first plurality of client devices during a local event, and
an input device configured to receive user interactions corresponding to actions with respect to the plurality of first virtual objects and the virtual world setting in the first augmented or mixed reality interactive environment; and
a server communicatively coupled to the first plurality of client devices via a network, the server transmitting runtime data corresponding to the virtual world setting for rendering by the first plurality of client devices, monitoring the user interactions and updating the runtime data to change the plurality of first virtual objects and the virtual world setting based on the user interactions and feedback from an accumulation of user interactions from users of prior sessions with the first augmented or mixed reality interactive environment, wherein the first and second of the first plurality of client devices are further configured to project the modified plurality of first virtual objects.

2. The system of claim 1 further comprising a theatrical structure including the retro-reflective screen on surrounding walls of the theatrical structure to provide a reflective environment and wherein the output devices of the first and second of the first plurality of client devices concurrently project virtual objects and backgrounds within the structure individualized for each of the respective ones of the first and second of the first plurality of client devices such that the virtual objects and backgrounds appear while being combined with the physical real-world objects differently to each user of the first and second of the first of the plurality of client devices.

3. The system of claim 2 wherein the theatrical structure comprises an at least partially curved dome shape and wherein the retro-reflective screen covers the walls and ceiling of the curved dome.

4. The system of claim 1 wherein the first plurality of client devices render the first augmented or mixed reality interactive environment with three-dimensional virtual-world image imagery rendered behind the physical real-world objects in context and uninterrupted.

5. The system of claim 1 wherein the first plurality of client devices render the first augmented or mixed reality interactive environment by merging physical real-world image elements with digital elements.

6. The system of claim 1 wherein the input device comprises a controller device that controls rendering of elements within the first augmented or mixed reality interactive environment.

7. The system of claim 6 wherein the input device detects a position of a user of each of the first and second of the first plurality of client devices and wherein the output device of each of the first and second of the first plurality of client devices projects the plurality of first virtual objects to appear from a perspective of the user of each of the first and second of the first plurality of client devices.

8. The system of claim 7 wherein the server further modifies the plurality of first virtual objects and the virtual world setting to react to the position and a viewing direction.

9. The system of claim 1 wherein the given one of the first plurality of client devices further comprises at least one sensor device configured to detect position markers to establish planar surfaces.

10. The system of claim 9 wherein the given one of the first plurality of client devices interpolates a user's position relative to the position markers detected by the at least one sensor device.

11. The system of claim 1 wherein the given one of the first plurality of client devices further comprises at least one sensor device selected from a group consisting of: cameras, microphones, radio-frequency identification devices, location detection systems, climate indicators, and physiological sensors.

12. The system of claim 11 wherein the first plurality of client devices render feature enhancements to the first augmented or mixed reality interactive environment in response to receiving micro-transactions.

13. The system of claim 12 wherein the feature enhancements include a modification to the plurality of first virtual objects and the virtual world setting.

14. The system of claim 13 wherein the server further modifies the plurality of first virtual objects and the virtual world setting based on the user participation data.

15. The system of claim 12 wherein the feature enhancements include a modification to the virtual world setting within the first augmented or mixed reality interactive environment.

16. The system of claim 1 wherein the server further generates user records including user participation data associated with the first augmented or mixed reality interactive environment.

17. The system of claim 1 further comprising a second plurality of client devices comprising processing devices that render a second augmented or mixed reality interactive environment that is shared among the second plurality of client devices, the second augmented or mixed reality interactive environment including one or more second virtual objects and virtual world setting, wherein one or more of the second plurality of client devices are configured to generate an individualized experience in the second augmented or mixed reality interactive environment within the enclosed structure concurrently with the rendering of the first augmented or mixed reality interactive environment.

18. The system of claim 17 wherein the server is coupled to the second plurality of client devices via the network, and wherein the output devices project stereoscopic or holographic images from a perspective of the user of each of the first and second of the first plurality of client devices.

19. The system of claim 18 wherein the server facilitates interactions between users in the first augmented or mixed reality interactive environment with users in the second augmented or mixed reality interactive environment by establishing a connection between the first plurality of client devices and the second plurality of client devices.

20. The system of claim 19 wherein the interactions include cooperative, player versus player, and interactive environment versus interactive environment play.

* * * * *